(12) United States Patent
Yang

(10) Patent No.: US 9,178,396 B2
(45) Date of Patent: Nov. 3, 2015

(54) CROSS-INTERLOCKED SWITCH TYPE DC ELECTRIC MACHINE HAVING AUXILIARY EXCITATION WINDING AND CONDUCTION RING AND BRUSH

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 306 days.

(21) Appl. No.: 13/836,526

(22) Filed: Mar. 15, 2013

(65) Prior Publication Data

US 2013/0328456 A1 Dec. 12, 2013

Related U.S. Application Data

(63) Continuation-in-part of application No. 13/493,157, filed on Jun. 11, 2012, now Pat. No. 9,000,649.

(51) Int. Cl.
| | |
|---|---|
| *H02K 3/28* | (2006.01) |
| *H02K 11/00* | (2006.01) |
| *H02K 19/38* | (2006.01) |
| *H02P 5/685* | (2006.01) |
| *H02P 7/282* | (2006.01) |

(52) U.S. Cl.
CPC .............. *H02K 3/28* (2013.01); *H02K 11/0015* (2013.01); *H02P 5/685* (2013.01); *H02P 7/282* (2013.01)

(58) Field of Classification Search
CPC ..... H02K 11/0015; H02K 3/28; H02K 16/00; H02K 19/12; H02K 21/042; H02P 5/685; H02P 7/282; H02P 7/06
USPC ................. 310/68 B, 180, 181, 112
See application file for complete search history.

(56) References Cited

U.S. PATENT DOCUMENTS

| | | | | |
|---|---|---|---|---|
| 1,646,821 | A * | 10/1927 | Karapetoff | ...................... 322/19 |
| 2,437,996 | A * | 3/1948 | Carnegie et al. | .............. 318/758 |
| 2,977,518 | A * | 3/1961 | Kafka et al. | .............. 318/400.17 |
| 3,675,099 | A * | 7/1972 | Johnston | ....................... 318/762 |
| 3,750,000 | A * | 7/1973 | Bruckner et al. | .............. 318/696 |
| 4,260,944 | A * | 4/1981 | O'Mahony | ....................... 322/48 |
| 4,412,794 | A * | 11/1983 | Presley | ...................... 418/61.1 |
| 4,532,458 | A * | 7/1985 | Kuznetsov et al. | ........... 318/111 |
| 4,786,853 | A * | 11/1988 | VanMaaren | ..................... 322/75 |
| 4,959,605 | A * | 9/1990 | Vaidya et al. | .................. 322/10 |
| 5,179,308 | A * | 1/1993 | Malsky | ........................ 310/90.5 |
| 6,278,211 | B1* | 8/2001 | Sweo | ............................ 310/114 |
| 6,373,204 | B1* | 4/2002 | Peterson et al. | ................ 318/41 |
| 7,250,734 | B1* | 7/2007 | Iannello et al. | ............. 318/254.1 |
| 7,915,778 | B2* | 3/2011 | Miyata et al. | .................. 310/180 |
| 2002/0117934 | A1* | 8/2002 | Kanazawa et al. | ............ 310/263 |
| 2002/0117935 | A1* | 8/2002 | Kanazawa et al. | ............ 310/263 |
| 2006/0097670 | A1* | 5/2006 | Fukasaku et al. | ............. 318/105 |
| 2009/0096310 | A1* | 4/2009 | Takeuchi | ................. 310/156.36 |
| 2010/0019701 | A1* | 1/2010 | Yang | .............................. 318/49 |
| 2010/0148717 | A1* | 6/2010 | Yang | ............................. 318/767 |
| 2012/0134856 | A1* | 5/2012 | Wu et al. | ....................... 417/350 |

* cited by examiner

*Primary Examiner* — Alex W Mok
(74) *Attorney, Agent, or Firm* — Bacon & Thomas, PLLC

(57) ABSTRACT

The present invention relates to a multi-set switched DC electric machine having conduction ring and brush and having its rotary part of electric machine being installed with an auxiliary excitation winding set, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine thereby changing the operational characteristic of the electric machine.

8 Claims, 4 Drawing Sheets

CROSS-INTERLOCKED SWITCH TYPE DC ELECTRIC MACHINE HAVING AUXILIARY EXCITATION WINDING AND CONDUCTION RING AND BRUSH

CROSS REFERENCE TO RELATED APPLICATION

This is a continuation-in part of application Ser. No. 13/493,157, filed on Jun. 11, 2012.

BACKGROUND OF THE INVENTION (a) Field of the Invention

The present invention relates to a multi-set switched DC electric machine having conduction ring and brush and having its rotary part of electric machine being installed with an auxiliary excitation winding set, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine thereby changing the operational characteristic of the electric machine.

(b) Description of the Prior Art

A conventional switched DC electric machine having conduction ring and brush, e.g. a switched electric machine having conduction ring and brush and having permanent magnetic pole or having reluctance rotor, often utilizes a Hall element for sensing locations so as to determine the switch timing, or utilizes an open loop means for allowing the magnetic field winding set to generate sequential excitation for driving the rotary part, so that there is a shortage of the mentioned structure that each switched DC electric machine having conduction ring and brush requires an individual electromechanical control unit.

SUMMARY OF THE INVENTION

The present invention relates to a multi-set switched DC electric machine having conduction ring and brush and having its rotary part of electric machine being installed with an auxiliary excitation winding set, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine thereby changing the operational characteristic of the electric machine.

DESCRIPTION OF MAIN COMPONENT SYMBOLS

Figure 1:
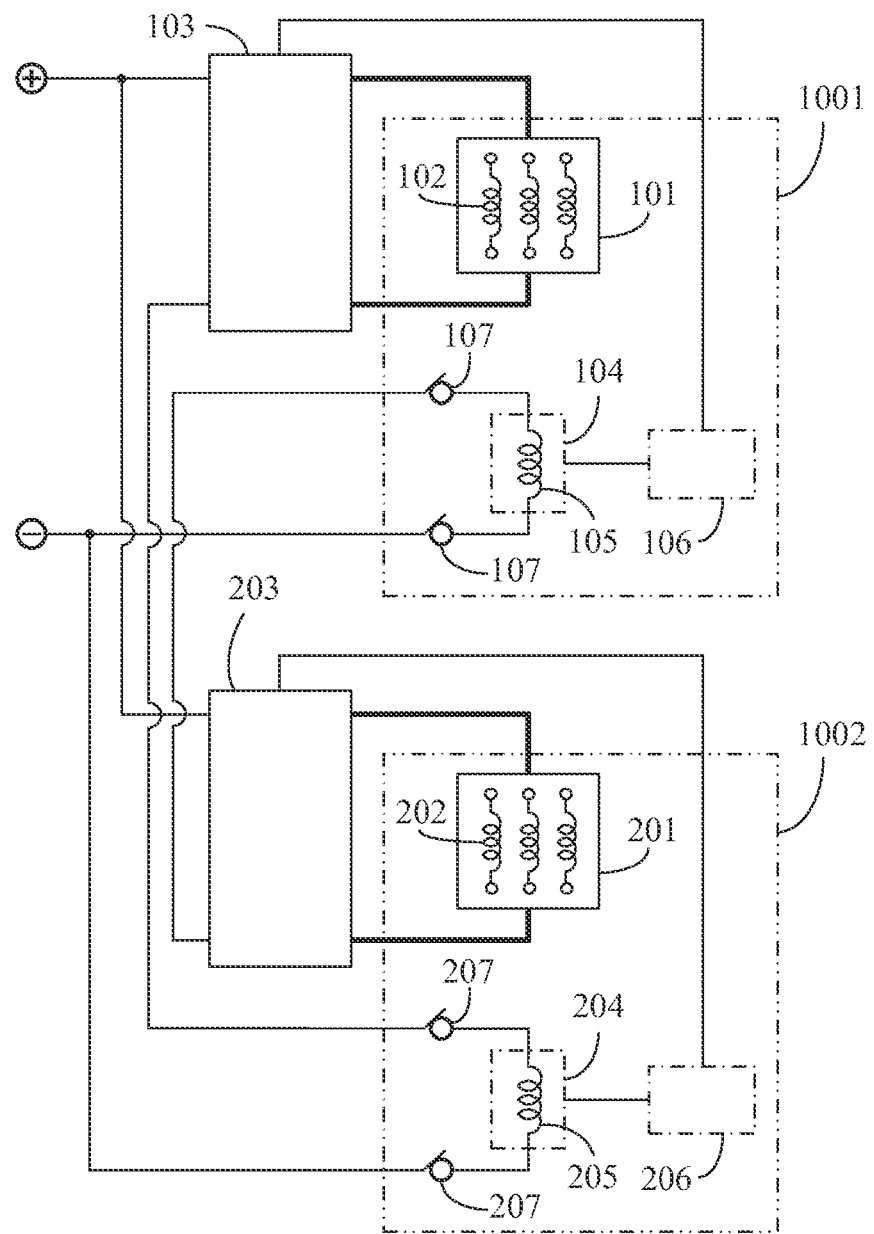
FIG. 1 is a schematic block diagram illustrating the cross-interlocked switch type DC electric machine system having conduction ring and brush being installed with the first serial type auxiliary excitation winding set (105) and the second serial type auxiliary excitation winding set (205), according to the present invention.

101: First magnetic field structure of electric machine
1001: First switched DC electric machine having conduction ring and brush
1002: Second switched DC electric machine having conduction ring and brush
102: First magnetic field winding set of electric machine
103: First drive control device
104: First rotary part of electric machine
105: First serial type auxiliary excitation winding set
106: First electric machine angular position sensor
107: First electric conduction ring and brush device
108: First parallel type auxiliary excitation winding set
201: Second magnetic field structure of electric machine
202: Second magnetic field winding set of electric machine
203: Second drive control device
204: Second rotary part of electric machine
205: Second serial type auxiliary excitation winding set
206: Second electric machine angular position sensor
207: Second electric conduction ring and brush device
208: Second parallel type auxiliary excitation winding set
301: Permanent magnetic pole of first rotary part of electric machine
305: First serial type regulating excitation winding set
401: Permanent magnetic pole of second rotary part of electric machine
405: Second serial type regulating excitation winding set

DETAILED DESCRIPTION OF THE PREFERRED EMBODIMENTS

The present invention relates to a multi-set switched DC electric machine having conduction ring and brush having its rotary part of electric machine being installed with an auxiliary excitation winding set, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine.

FIG. 1 is a schematic block diagram illustrating the cross-interlocked switched DC electric machine system having conduction ring and brush being installed with the first serial type auxiliary excitation winding set (105) and the second serial type auxiliary excitation winding set (205), according to the present invention;

As shown in FIG. 1, it mainly consists of:

first drive control device (103): constituted by a drive electric control device composed of electromechanical components and/or solid sate components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft and a housing, the characteristic is being coupled at a lateral side of the first magnetic field structure of electric machine (101), provided with a salient pole structure having magnetic conductive feature and having the magnetic poles with the quantity same as or different from that of the first magnetic field structure of electric machine (101), the characteristic is that the magnetic pole of the first rotary part of electric machine (104) being installed with the first serial type auxiliary excitation winding set (105) thereby transmitting the excitation electric power between the mentioned winding set and the exterior through the first electric conduction ring and brush device (107);

first serial type auxiliary excitation winding set (105): constituted by conductive wires wound on the magnetic pole of the first rotary part of electric machine (104), and transmitting the electric power between the mentioned winding set and the exterior through the first electric conduction ring and brush device (107), the installation means includes installing the first serial type auxiliary excitation winding set (105), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source;

first electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and the exterior;

With the housing, the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device composed of electromechanical components and/or solid sate components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator;

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (201) and the second rotary part of electric machine (204) allows the shifting magnetic field of the second magnetic field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft and a housing, the characteristic is being coupled at a lateral side of the second magnetic field structure of electric machine (201), provided with a salient pole structure having magnetic conductive feature and having the magnetic poles with the quantity same as or different from that of the second magnetic field structure of electric machine (201), the characteristic is that the magnetic pole of the second rotary part of electric machine (204) being installed with the second serial type auxiliary excitation winding set (205) thereby transmitting the excitation electric power between the mentioned winding set and the exterior through the second electric conduction ring and brush device (207);

second serial type auxiliary excitation winding set (205): constituted by conductive wires wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source;

second electric conduction ring and brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and the exterior;

with the housing, the bearing or locking screws, the second switched DC electric machine having conduction ring and brush (1002) can be assembled by the mentioned components, wherein the second drive control device (203) can be co-structured with the second switched DC electric machine having conduction ring and brush (1002) or separately provided.

Figure 2:
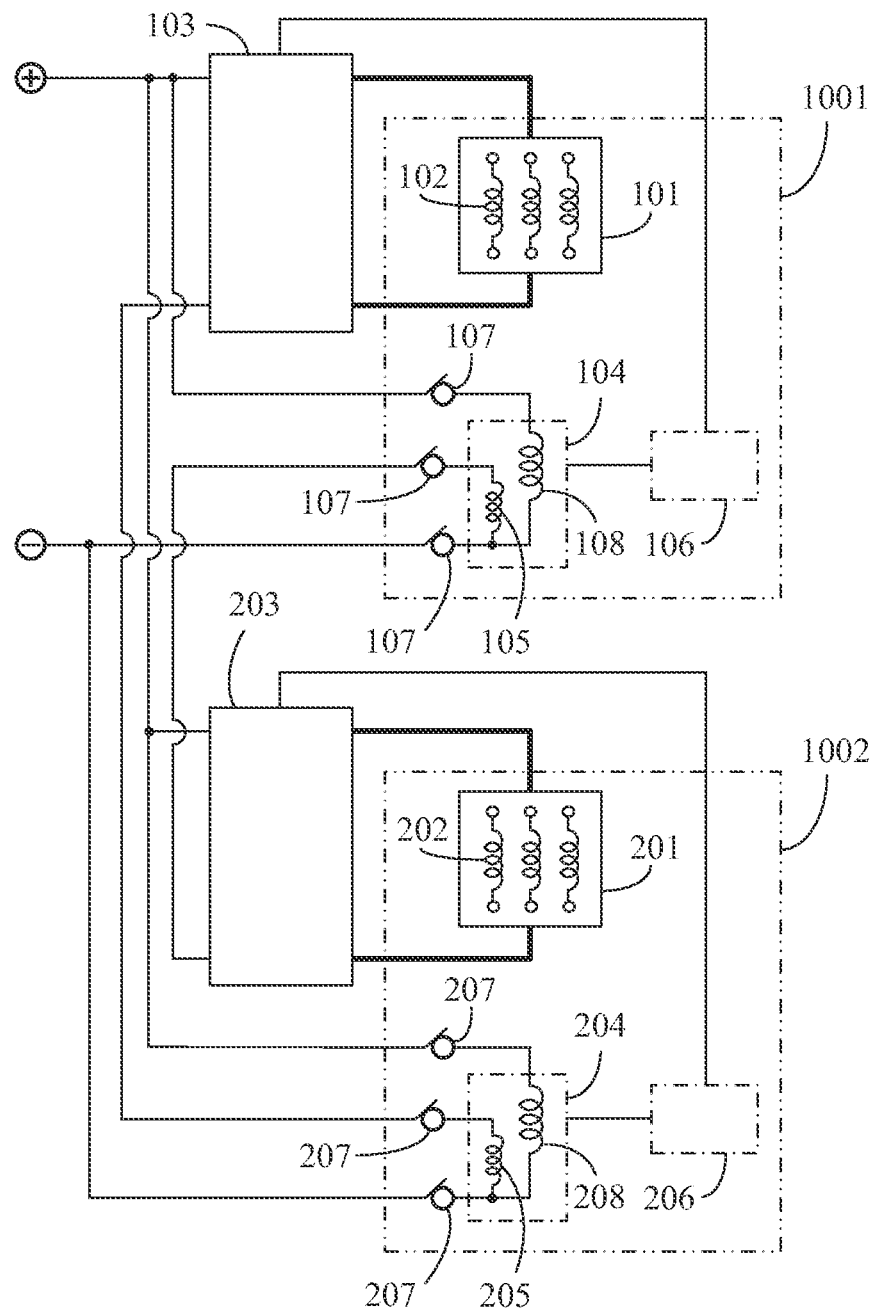
FIG. 2 is a schematic block diagram illustrating the cross-interlocked switch type DC electric machine system having conduction ring and brush being installed with the first serial type auxiliary excitation winding set (105), the second serial type auxiliary excitation winding set (205), the first parallel type auxiliary excitation winding set (108) and the second parallel type auxiliary excitation winding set (208), according to the present invention.

FIG. 2 is a schematic block diagram illustrating the cross-interlocked switched DC electric machine system having conduction ring and brush being installed with the first serial type auxiliary excitation winding set (105), the second serial type auxiliary excitation winding set (205), the first parallel type auxiliary excitation winding set (108) and the second parallel type auxiliary excitation winding set (208), according to the present invention;

As shown in FIG. 2, it mainly consists of:

first drive control device (103): constituted by a drive electric control device composed of electromechanical components and/or solid sate components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator; and controlling the voltage, the current and the polarity of excitation electric power passing the first parallel type auxiliary excitation winding set (108);

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft and a housing, the characteristic is being coupled at a lateral side of the first magnetic field structure of electric machine (101), provided with a salient pole structure having magnetic conductive feature and having the magnetic poles with the quantity same as or different from that of the first magnetic field structure of electric machine (101), the characteristic is that the magnetic pole of the first rotary part of electric machine (104) being installed with the first serial type auxiliary excitation winding set (105) thereby transmitting the excitation electric power between the mentioned winding set and the exterior through the first electric conduction ring and brush device (107);

first serial type auxiliary excitation winding set (105): constituted by conductive wires wound on the magnetic pole of the first rotary part of electric machine (104), and transmitting the electric power between the mentioned winding set and the exterior through the first electric conduction ring and brush device (107), the installation means include installing one or both of the first serial type auxiliary excitation winding set (105) and the first parallel type auxiliary excitation winding set (108), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source; the first parallel type auxiliary excitation winding set (108) is connected in parallel with the DC power source or the output end of the first drive control device (103) or two ends of the first magnetic field winding set of electric machine (102);

first electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and/or the first parallel type auxiliary excitation winding set (108) and the exterior;

With the housing, the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device composed of electromechanical components and/or solid sate components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator; and controlling the voltage, the current and the polarity of the excitation electric power passing the second parallel type auxiliary excitation winding set (208);

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (201) and the second rotary part of electric machine (204) allows the shifting magnetic field of the second field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft and a housing, the characteristic is being coupled at a lateral side of the second magnetic field structure of electric machine (201), provided with a salient pole structure having magnetic conductive feature and having the magnetic poles with the quantity same as or different from that of the second magnetic field structure of electric machine (201), or having permanent magnetic pole and having the magnetic poles with the quantity same as or different from that of the second magnetic field structure of electric machine (201), the characteristic is that the magnetic pole of the second rotary part of electric machine (204) being installed with the second serial type auxiliary excitation winding set (205) thereby transmitting the excitation electric power between the mentioned winding set and the exterior through the second electric conduction ring and brush device (207);

second serial type auxiliary excitation winding set (205): constituted by conductive wires wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205) or the second parallel type auxiliary excitation winding set (208), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source; the second parallel type auxiliary excitation winding set (208) is connected in parallel with the DC power source or the output end of the second drive control device (203) or two ends of the second magnetic field winding set of electric machine (202);

second electric conduction ring and brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and/or the second parallel type auxiliary excitation winding set (208) and the exterior;

with the housing, the bearing or locking screws, the second switched DC electric machine having conduction ring and brush (1002) can be assembled by the mentioned components, wherein the second drive control device (203) can be co-structured with the second switched DC electric machine having conduction ring and brush (1002) or separately provided.

Figure 3:
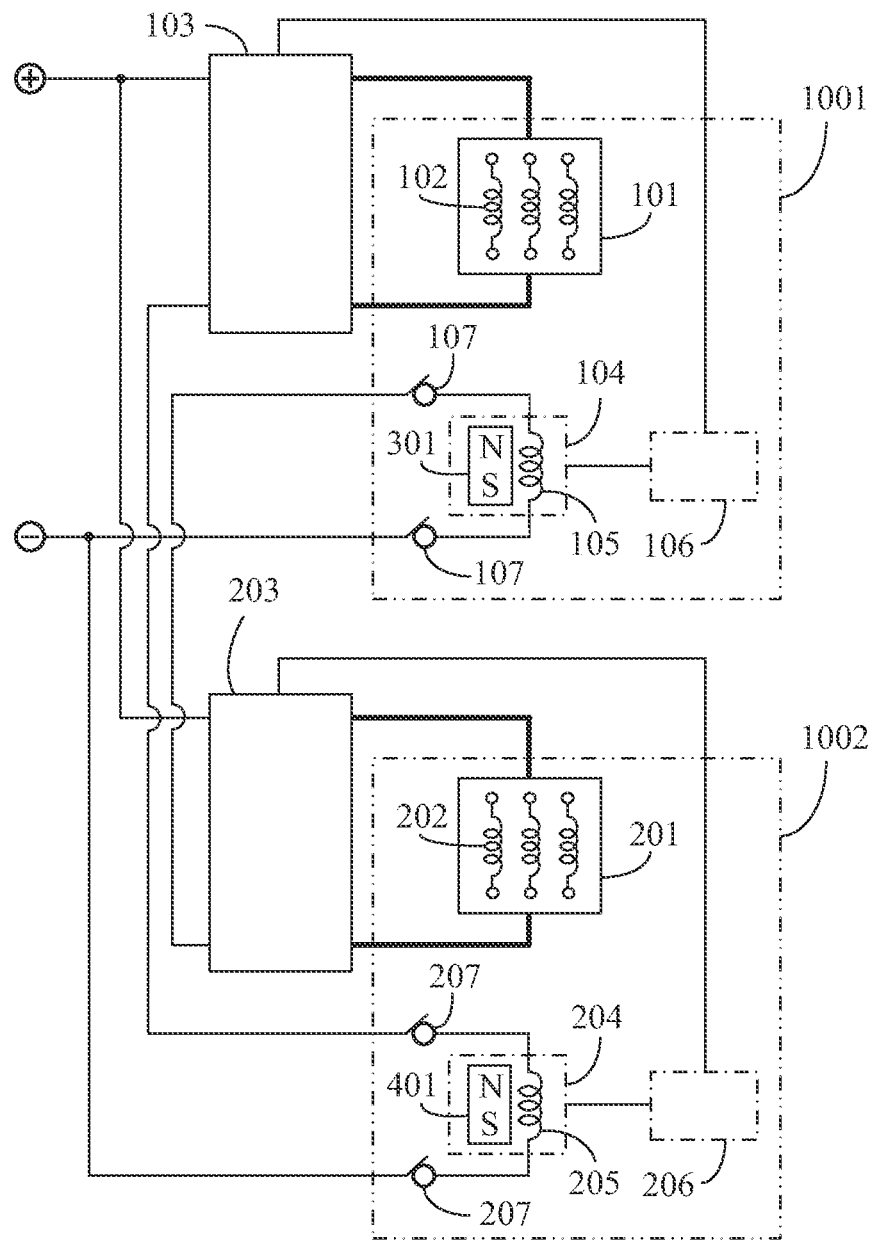
FIG. 3 is a schematic block diagram illustrating the cross-interlocked multi-phase switched DC electric machine system having conduction ring and brush being installed with the first serial type auxiliary excitation winding set (105), the permanent magnetic pole of first rotary part of electric machine (301), the second serial type auxiliary excitation winding set (205) and the permanent magnetic pole of second rotary part of electric machine (401), according to the present invention.

FIG. 3 is a schematic block diagram illustrating the cross-interlocked multi-phase switched DC electric machine system having conduction ring and brush being installed with the first serial type auxiliary excitation winding set (105), the permanent magnetic pole of first rotary part of electric machine (301), the second serial type auxiliary excitation winding set (205) and the permanent magnetic pole of second rotary part of electric machine (401), according to the present invention;

As shown in FIG. 3, it mainly consists of:

first drive control device (103): constituted by a drive electric control device composed of electromechanical components and/or solid sate components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft and a housing, the characteristic is being coupled at a lateral side of the first magnetic field structure of electric machine (101), provided with a salient pole structure having magnetic conductive feature and having the magnetic poles with the quantity same as or different from that of the first magnetic field structure of electric machine (101), and provided with the permanent magnetic pole of first rotary part of electric machine (301) having the magnetic poles with the quantity same as or different from that of the first magnetic field structure of electric machine (101), the characteristic is that the magnetic pole of the first rotary part of electric machine (104) being installed with the first serial type auxiliary excitation winding set (105) thereby transmitting the excitation electric power between the mentioned winding set and the exterior through the first electric conduction ring and brush device (107); the first serial type auxiliary excitation winding set (105) and the permanent magnetic pole of first rotary part of electric machine (301) include being installed at the same polarity for auxiliary excitation or at different polarity for differential excitation;

first serial type auxiliary excitation winding set (105): constituted by conductive wires wound on the magnetic pole of the first rotary part of electric machine (104), and transmitting the electric power between the mentioned winding set and the exterior through the first electric conduction ring and brush device (107), the installation means includes installing the first serial type auxiliary excitation winding set (105), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source;

first electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and the exterior;

With the housing, the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device composed of electromechanical components and/or solid sate components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator;

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (201) and the second rotary part of electric machine (204) allows the shifting magnetic field of the second magnetic field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft and a housing, the characteristic is being coupled at a lateral side of the second magnetic field structure of electric machine (201), provided with a salient pole structure having magnetic conductive feature and having the magnetic poles with the quantity same as or different from that of the second magnetic field structure of electric machine (201), and provided with the permanent magnetic pole of second rotary part of electric machine (401) having the magnetic poles with the quantity same as or different from that of the second magnetic field structure of electric machine (201), the characteristic is that the magnetic pole of the second rotary part of electric machine (204) being installed with the second serial type auxiliary excitation winding set (205) thereby transmitting the excitation electric power between the mentioned winding set and the exterior through the second electric conduction ring and brush device (207); the second serial type auxiliary excitation winding set (205) and the permanent magnetic pole of second rotary part of electric machine (401) include being installed at the same polarity for auxiliary excitation or at different polarity for differential excitation;

second serial type auxiliary excitation winding set (205): constituted by conductive wires wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source;

second electric conduction ring and brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and the exterior;

with the housing, the bearing or locking screws, the second switched DC electric machine having conduction ring and brush (1002) can be assembled by the mentioned components, wherein the second drive control device (203) can be co-structured with the second switched DC electric machine having conduction ring and brush (1002) or separately provided.

Figure 4:
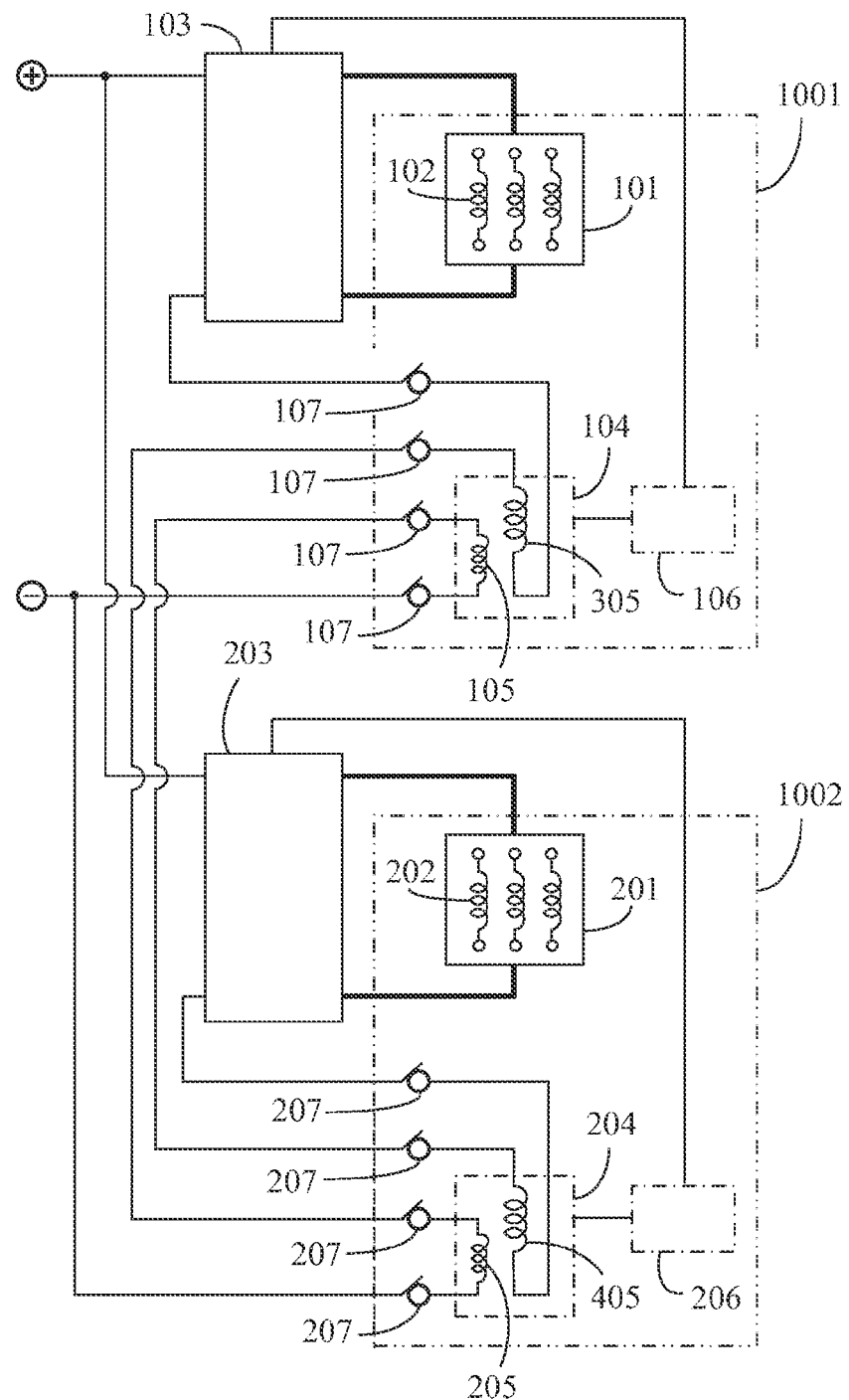
FIG. 4 is a schematic block diagram illustrating the semi cross-interlocked multi-phase switched DC electric machine system having conduction ring and brush being installed with the first serial type auxiliary excitation winding set (105), the first serial type regulating excitation winding set (305), the second serial type auxiliary excitation winding set (205) and the second serial type regulating excitation winding set (405), according to the present invention.

FIG. 4 is a schematic block diagram illustrating the semi cross-interlocked multi-phase switched DC electric machine system having conduction ring and brush being installed with the first serial type auxiliary excitation winding set (105), the first serial type regulating excitation winding set (305), the second serial type auxiliary excitation winding set (205) and the second serial type regulating excitation winding set (405), according to the present invention;

As shown in FIG. 4, it mainly consists of:

first drive control device (103): constituted by a drive electric control device composed of electromechanical components and/or solid sate components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft and a housing, the characteristic is being coupled at a lateral side of the first magnetic field structure of electric machine (101), provided with a salient pole structure having magnetic conductive feature and having the magnetic poles with the quantity same as or different from that of the first magnetic field structure of electric machine (101), the characteristic is that the magnetic pole of the first rotary part of electric machine (104) being installed with the first serial type auxiliary excitation winding set (105) and the first serial type regulating excitation winding set (305) thereby transmitting the excitation electric power between the mentioned winding set and the exterior through the first electric conduction ring and brush device (107);

first serial type regulating excitation winding set (305): constituted by conductive wires wound on the magnetic pole of the first rotary part of electric machine (104), and transmitting electric power between the mentioned winding set and the exterior through the first electric conduction ring and brush device (107);

first serial type auxiliary excitation winding set (105): constituted by conductive wires wound on the magnetic pole of the first rotary part of electric machine (104), and transmitting the electric power between the mentioned winding set and the exterior through the first electric conduction ring and brush device (107), the installation means include installing the first serial type auxiliary excitation winding set (105) and the first serial type regulating excitation winding set (305), wherein the first serial type auxiliary excitation winding set (105) is leaded to the negative end of the power source through the first electric conduction ring and brush device (107), the other end is connected in series with the second serial type regulating excitation winding set (405) of the second rotary part of electric machine (204) through the first electric conduction ring and brush device (107) and the second electric conduction ring and brush device (207), then leaded to one side of the power source end of the second drive control device (203) of the second magnetic field winding set of electric machine (202) through the second electric conduction ring and brush device (207), then leaded to the positive end of the DC power source through the other side of the power source end of the second drive control device (203);

first electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and/or the first parallel type auxiliary excitation winding set (108) and the exterior;

With the housing, the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device composed of electromechanical components and/or solid sate components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator; and controlling the voltage, the current and the polarity of the excitation electric power passing the second parallel type auxiliary excitation winding set (208);

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (201) and the second rotary part of electric machine (204) allows the shifting magnetic field of the second field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft and a housing, the characteristic is being coupled at a lateral side of the second magnetic field structure of electric machine (201), provided with a salient pole structure having magnetic conductive feature and having the magnetic poles with the quantity same as or different from that of the second magnetic field structure of electric machine (201), the characteristic is that the magnetic pole of the second rotary part of electric machine (204) being installed with the second serial type auxiliary excitation winding set (205) and the second serial type regulating excitation winding set (405) thereby transmitting the excitation electric power between the mentioned winding set and the exterior through the second electric conduction ring and brush device (207);

second serial type regulating excitation winding set (405): constituted by conductive wires wounded on the magnetic pole of the second rotary part of electric machine (204), and transmitting electric power between the mentioned winding set and the exterior through the second electric conduction ring and brush device (207);

second serial type auxiliary excitation winding set (205): constituted by conductive wires wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205) and the second serial type regulating excitation winding set (405), wherein the second serial type auxiliary excitation winding set (205) is leaded to the negative end of the power source through the second electric conduction ring and brush device (207), the other end is connected in series with the first serial type regulating excitation winding set (305) of the first rotary part of electric machine (104) through the second electric conduction ring and brush device (207) and the first electric conduction ring and brush device (107), then leaded to one side of the power source end of the first drive control device (103) of the first magnetic field winding set of electric machine (102) through the first electric conduction ring and brush device (107), then leaded to the positive end of the DC power source through the other side of the power source end of the first drive control device (103);

second electric conduction ring and brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and/or the second parallel type auxiliary excitation winding set (208) and the exterior;

the semi cross-interlocked electric machine system is formed through selecting the excitation polarity of the first serial type auxiliary excitation winding set (105) and the first serial type regulating excitation winding set (305) for auxiliary excitation or differential excitation, and through selecting the excitation polarity of the second serial type auxiliary excitation winding set (205) and the second serial type regulating excitation winding set (405) for auxiliary excitation or differential excitation;

with the housing, the bearing or locking screws, the second switched DC electric machine having conduction ring and brush (1002) can be assembled by the mentioned components, wherein the second drive control device (203) can be co-structured with the second switched DC electric machine having conduction ring and brush (1002) or separately provided.

According to the embodiments disclosed in FIG. 1 and FIG. 4 which adopt the first switched DC electric machine having conduction ring and brush (1001) and the second switched DC electric machine (1002) having conduction ring and brush as the example of two switched DC electric machines having conduction ring and brush, when being practiced, adjacent serial type auxiliary excitation winding sets of two or more switched DC electric machines having conduction ring and brush can be connected in series at the electric power input end of the drive control device served to drive the magnetic field winding set of electric machine, then leaded to the DC power source, and the serial type auxiliary excitation winding set of the last set of switched DC electric machine having conduction ring and brush is connected in series with the electric power input end of the first drive control device served to drive the first magnetic field winding set of electric machine then leaded to the DC power source, thereby constituting the cross-interlocked switch type DC electric machine having auxiliary excitation winding and conduction ring and brush.

The invention claimed is:

1. A cross-interlocked switch type DC electric machine having auxiliary excitation winding and conduction ring and brush, which relates to a multi-set switched DC electric machine having conduction ring and brush having its rotary part of electric machine being installed with an auxiliary excitation winding set, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine, and it mainly consists of:

first drive control device (103): constituted by a drive electric control device that serves to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): installed with the first magnetic field winding set of electric machine (102) having two or more phases, and coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): wherein the first rotary part of the electric machine (104) is coupled at a lateral side of the first magnetic field structure of electric machine (101), provided with a salient pole structure having magnetic conductive feature and having the magnetic poles with the quantity same as or different from that of the first magnetic field structure of electric machine (101), and wherein the magnetic pole of the first rotary part of electric machine (104) is installed with the first serial type auxiliary excitation winding set (105) thereby transmitting the excitation electric power between the mentioned winding set and the exterior through the first electric conduction ring and brush device (107);

first serial type auxiliary excitation winding set (105): wound on the magnetic pole of the first rotary part of electric machine (104), and transmitting the electric power between the mentioned winding set and the exterior through the first electric conduction ring and brush device (107), the installation means includes installing the first serial type auxiliary excitation winding set (105), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source;

first electric conduction ring and brush device (107): respectively installed between the revolving rotary part of electric machine and the exterior, so while the rotary part revolving, the electric power is enabled to be transmitted between the first serial type auxiliary excitation winding set (105) and the exterior, wherein the first switched DC electric machine having conduction ring and brush device (1001) can be assembled by the mentioned components, wherein the first drive control device (103) can be co-structured with the first switched DC electric machine having conduction ring and brush (1001) or separately provided;

second drive control device (203): constituted by a drive electric control device that serves to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator;

second magnetic field structure of electric machine (201): installed with the second magnetic field winding set of electric machine (202) having two or more phases, and coupled to the second rotary part of electric machine (204), the magnetic loop formed by the second magnetic field structure of electric machine (201) and the second rotary part of electric machine (204) allows the shifting magnetic field of the second magnetic field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): wherein the second rotary part of electric machine (204) is coupled at a lateral side of the second magnetic field structure of electric machine (201), provided with a salient pole structure having magnetic conductive feature and having the magnetic poles with the quantity same as or different from that of the second magnetic field structure of electric machine (201), and wherein the magnetic pole of the second rotary part of electric machine (204) is installed with the second serial type auxiliary excitation winding set (205) thereby transmitting the excitation electric power between the mentioned winding set and the exterior through the second electric conduction ring and brush device (207);

second serial type auxiliary excitation winding set (205): wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source;

second electric conduction ring and brush device (207): respectively installed between the revolving rotary part of electric machine and the exterior, so while the rotary part revolving, the electric power is enabled to be transmitted between the second serial type auxiliary excitation winding set (205) and the exterior, wherein the second switched DC electric machine having conduction ring and brush (1002) can be assembled by the mentioned components, wherein the second drive control device (203) can be co-structured with the second switched DC electric machine having conduction ring and brush (1002) or separately provided.

2. A cross-interlocked switch type DC electric machine having auxiliary excitation winding and conduction ring and brush as claimed in claim 1, wherein the cross-interlocked switched DC electric machine system having conduction ring and brush being installed with the first serial type auxiliary excitation winding set (105), the second serial type auxiliary excitation winding set (205), the first parallel type auxiliary excitation winding set (108) and the second parallel type auxiliary excitation winding set (208), and it mainly consists of:

first drive control device (103): constituted by a drive electric control device that serves to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator; and controlling the voltage, the current and the polarity of excitation electric power passing the first parallel type auxiliary excitation winding set (108);

first magnetic field structure of electric machine (101): installed with the first magnetic field winding set of electric machine (102) having two or more phases, and coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): wherein the first rotary part of the electric machine (104) is coupled at a lateral side of the first magnetic field structure of electric machine (101), provided with a salient pole structure having magnetic conductive feature and having the magnetic poles with the quantity same as or different from that of the first magnetic field structure of electric machine (101), and wherein the magnetic pole of the first rotary part of electric machine (104) is installed with the first serial type auxiliary excitation winding set (105) thereby transmitting the excitation electric power between the mentioned winding set and the exterior through the first electric conduction ring and brush device (107);

first serial type auxiliary excitation winding set (105): wound on the magnetic pole of the first rotary part of electric machine (104), and transmitting the electric power between the mentioned winding set and the exterior through the first electric conduction ring and brush device (107), the installation means include installing one or both of the first serial type auxiliary excitation winding set (105) and the first parallel type auxiliary excitation winding set (108), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source; the first parallel type auxiliary excitation winding set (108) is connected in parallel with the DC power source or the output end of the first drive control device (103) or two ends of the first magnetic field winding set of electric machine (102);

first electric conduction ring and brush device (107): respectively installed between the revolving rotary part of electric machine and the exterior, so while the rotary part revolving, the electric power is enabled to be transmitted between the first serial type auxiliary excitation winding set (105) and/or the first parallel type auxiliary excitation winding set (108) and the exterior, wherein the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device that serves to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator; and controlling the voltage, the current and the polarity of the excitation electric power passing the second parallel type auxiliary excitation winding set (208);

second magnetic field structure of electric machine (201): installed with the second magnetic field winding set of electric machine (202) having two or more phases, and coupled to the second rotary part of electric machine (204), the magnetic loop formed by the second magnetic field structure of electric machine (201) and the second rotary part of electric machine (204) allows the shifting magnetic field of the second field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): wherein the second rotary part of the electric machine (204) is coupled at a lateral side of the second magnetic field structure of electric machine (201), provided with a salient pole structure having magnetic conductive feature and having the magnetic poles with the quantity same as or different from that of the second magnetic field structure of electric machine (201), or having permanent magnetic pole and having the magnetic poles with the quantity same as or different from that of the second magnetic field structure of electric machine (201), and wherein the magnetic pole of the second rotary part of electric machine (204) is installed with the second serial type auxiliary excitation winding set (205) thereby transmitting the excitation electric power between the mentioned winding set and the exterior through the second electric conduction ring and brush device (207);

second serial type auxiliary excitation winding set (205): wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205) or the second parallel type auxiliary excitation winding set (208), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source; the second parallel type auxiliary excitation winding set (208) is connected in parallel with the DC power source or the output end of the second drive control device (203) or two ends of the second magnetic field winding set of electric machine (202);

second electric conduction ring and brush device (207): respectively installed between the revolving rotary part of electric machine and the exterior, so while the rotary part revolving, the electric power is enabled to be transmitted between the second serial type auxiliary excitation winding set (205) and/or the second parallel type auxiliary excitation winding set (208) and the exterior, wherein the second switched DC electric machine having conduction ring and brush (1002) can be assembled by the mentioned components, wherein the second drive control device (203) can be co-structured with the second switched DC electric machine having conduction ring and brush (1002) or separately provided.

3. A cross-interlocked switch type DC electric machine having auxiliary excitation winding and conduction ring and brush as claimed in claim 2, wherein further includes that adjacent serial type auxiliary excitation winding sets of two or more switched DC electric machines having conduction ring and brush can be connected in series at the electric power input end of the drive control device served to drive the magnetic field winding set of electric machine, then leaded to the DC power source, and the serial type auxiliary excitation winding set of the last set of switched DC electric machine having conduction ring and brush is connected in series with the electric power input end of the first drive control device served to drive the first magnetic field winding set of electric machine then leaded to the DC power source, thereby constituting the cross-interlocked switch type DC electric machine having auxiliary excitation winding and conduction ring and brush.

4. A cross-interlocked switch type DC electric machine having auxiliary excitation winding and conduction ring and brush as claimed in claim 1, wherein the cross-interlocked multi-phase switched DC electric machine system having conduction ring and brush being installed with the first serial type auxiliary excitation winding set (105), the permanent magnetic pole of first rotary part of electric machine (301), the second serial type auxiliary excitation winding set (205) and the permanent magnetic pole of second rotary part of electric machine (401), and it mainly consists of:

first drive control device (103): constituted by a drive electric control device that serves to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): installed with the first magnetic field winding set of electric machine (102) having two or more phases, and coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): wherein the first rotary part of the electric machine (104) is coupled at a lateral side of the first magnetic field structure of electric machine (101), provided with a salient pole structure having magnetic conductive feature and having the magnetic poles with the quantity same as or different from that of the first magnetic field structure of electric machine (101), and provided with the permanent magnetic pole of first rotary part of electric machine (301) having the magnetic poles with the quantity same as or different from that of the first magnetic field structure of electric machine (101), wherein the magnetic pole of the first rotary part of electric machine (104) is installed with the first serial type auxiliary excitation winding set (105) thereby transmitting the excitation electric power between the mentioned winding set and the exterior through the first electric conduction ring and brush device (107); the first serial type auxiliary excitation winding set (105) and the permanent magnetic pole of first rotary part of electric machine (301) include being installed at the same polarity for auxiliary excitation or at different polarity for differential excitation;

first serial type auxiliary excitation winding set (105): wound on the magnetic pole of the first rotary part of electric machine (104), and transmitting the electric power between the mentioned winding set and the exterior through the first electric conduction ring and brush device (107), the installation means includes installing the first serial type auxiliary excitation winding set (105), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source;

first electric conduction ring and brush device (107): respectively installed between the revolving rotary part of electric machine and the exterior, so while the rotary part revolving, the electric power is enabled to be transmitted between the first serial type auxiliary excitation winding set (105) and the exterior, wherein the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device that serves to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator;

second magnetic field structure of electric machine (201): installed with the second magnetic field winding set of electric machine (202) having two or more phases, and coupled to the second rotary part of electric machine (204), the magnetic loop formed by the second magnetic field structure of electric machine (201) and the second rotary part of electric machine (204) allows the shifting magnetic field of the second magnetic field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): wherein the second rotary part of the electric machine (204) is coupled at a lateral side of the second magnetic field structure of electric machine (201), provided with a salient pole structure having magnetic conductive feature and having the magnetic poles with the quantity same as or different from that of the second magnetic field structure of electric machine (201), and provided with the permanent magnetic pole of second rotary part of electric machine (401) having the magnetic poles with the quantity same as or different from that of the second magnetic field structure of electric machine (201), and wherein the magnetic pole of the second rotary part of electric machine (204) is installed with the second serial type auxiliary excitation winding set (205) thereby transmitting the excitation electric power between the mentioned winding set and the exterior through the second electric conduction ring and brush device (207); the second serial type auxiliary excitation winding set (205) and the permanent magnetic pole of second rotary part of electric machine (401) include being installed at the same polarity for auxiliary excitation or at different polarity for differential excitation;

second serial type auxiliary excitation winding set (205): wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source;

second electric conduction ring and brush device (207): respectively installed between the revolving rotary part of electric machine and the exterior, so while the rotary part revolving, the electric power is enabled to be transmitted between the second serial type auxiliary excitation winding set (205) and the exterior, wherein the second switched DC electric machine having conduction ring and brush (1002) can be assembled by the mentioned components, wherein the second drive control device (203) can be co-structured with the second switched DC electric machine having conduction ring and brush (1002) or separately provided.

5. A cross-interlocked switch type DC electric machine having auxiliary excitation winding and conduction ring and brush as claimed in claim 4, wherein further includes that adjacent serial type auxiliary excitation winding sets of two or more switched DC electric machines having conduction ring and brush can be connected in series at the electric power input end of the drive control device served to drive the magnetic field winding set of electric machine, then leaded to the DC power source, and the serial type auxiliary excitation winding set of the last set of switched DC electric machine having conduction ring and brush is connected in series with the electric power input end of the first drive control device served to drive the first magnetic field winding set of electric machine then leaded to the DC power source, thereby constituting the cross-interlocked switch type DC electric machine having auxiliary excitation winding and conduction ring and brush.

6. A cross-interlocked switch type DC electric machine having auxiliary excitation winding and conduction ring and brush as claimed in claim 1, wherein the semi cross-interlocked multi-phase switched DC electric machine system having conduction ring and brush being installed with the first serial type auxiliary excitation winding set (105), the first serial type regulating excitation winding set (305), the second serial type auxiliary excitation winding set (205) and the second serial type regulating excitation winding set (405), and it mainly consists of:

first drive control device (103): constituted by a drive electric control device that serves to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): installed with the first magnetic field winding set of electric machine (102) having two or more phases, and coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): wherein the first rotary part of the electric machine (104) is coupled at a lateral side of the first magnetic field structure of electric machine (101), provided with a salient pole structure having magnetic conductive feature and having the magnetic poles with the quantity same as or different from that of the first magnetic field structure of electric machine (101), and wherein the magnetic pole of the first rotary part of electric machine (104) is installed with the first serial type auxiliary excitation winding set (105) and the first serial type regulating excitation winding set (305) thereby transmitting the excitation electric power between the mentioned winding set and the exterior through the first electric conduction ring and brush device (107);

first serial type regulating excitation winding set (305): wound on the magnetic pole of the first rotary part of electric machine (104), and transmitting electric power between the mentioned winding set and the exterior through the first electric conduction ring and brush device (107);

first serial type auxiliary excitation winding set (105): wound on the magnetic pole of the first rotary part of electric machine (104), and transmitting the electric power between the mentioned winding set and the exterior through the first electric conduction ring and brush device (107), the installation means include installing the first serial type auxiliary excitation winding set (105) and the first serial type regulating excitation winding set (305), wherein the first serial type auxiliary excitation winding set (105) is leaded to the negative end of the power source through the first electric conduction ring and brush device (107), the other end is connected in series with the second serial type regulating excitation winding set (405) of the second rotary part of electric machine (204) through the first electric conduction ring and brush device (107) and the second electric conduction ring and brush device (207), then leaded to one side of the power source end of the second drive control device (203) of the second magnetic field winding set of electric machine (202) through the second electric conduction ring and brush device (207), then leaded to the positive end of the DC power source through the other side of the power source end of the second drive control device (203);

first electric conduction ring and brush device (107): respectively installed between the revolving rotary part of electric machine and the exterior, so while the rotary part revolving, the electric power is enabled to be transmitted between the first serial type auxiliary excitation winding set (105) and/or the first parallel type auxiliary excitation winding set (108) and the exterior, wherein the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device that serves to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator; and controlling the voltage, the current and the polarity of the excitation electric power passing the second parallel type auxiliary excitation winding set (208);

second magnetic field structure of electric machine (201): constituted by installed with the second magnetic field winding set of electric machine (202) having two or more phases, and coupled to the second rotary part of electric machine (204), the magnetic loop formed by the second magnetic field structure of electric machine (201) and the second rotary part of electric machine (204) allows the shifting magnetic field of the second field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): wherein the second rotary part of the electric machine (204) is coupled at a lateral side of the second magnetic field structure of electric machine (201), provided with a salient pole structure having magnetic conductive feature and having the magnetic poles with the quantity same as or different from that of the second magnetic field structure of electric machine (201), and wherein the magnetic pole of the second rotary part of electric machine (204) is installed with the second serial type auxiliary excitation winding set (205) and the second serial type regulating excitation winding set (405) thereby transmitting the excitation electric power between the mentioned winding set and the exterior through the second electric conduction ring and brush device (207);

second serial type regulating excitation winding set (405): wound on the magnetic pole of the second rotary part of electric machine (204), and transmitting electric power between the mentioned winding set and the exterior through the second electric conduction ring and brush device (207);

second serial type auxiliary excitation winding set (205): wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205) and the second serial type regulating excitation winding set (405), wherein the second serial type auxiliary excitation winding set (205) is leaded to the negative end of the power source through the second electric conduction ring and brush device (207), the other end is connected in series with the first serial type regulating excitation winding set (305) of the first rotary part of electric machine (104) through the second electric conduction ring and brush device (207) and the first electric conduction ring and brush device (107), then leaded to one side of the power source end of the first drive control device (103) of the first magnetic field winding set of electric machine (102) through the first electric conduction ring and brush device (107), then leaded to the positive end of the DC power source through the other side of the power source end of the first drive control device (103);

second electric conduction ring and brush device (207): respectively installed between the revolving rotary part of electric machine and the exterior, so while the rotary part revolving, the electric power is enabled to be transmitted between the second serial type auxiliary excitation winding set (205) and/or the second parallel type auxiliary excitation winding set (208) and the exterior;

the semi cross-interlocked electric machine system is formed through selecting the excitation polarity of the first serial type auxiliary excitation winding set (105) and the first serial type regulating excitation winding set (305) for auxiliary excitation or differential excitation, and through selecting the excitation polarity of the second serial type auxiliary excitation winding set (205) and the second serial type regulating excitation winding set (405) for auxiliary excitation or differential excitation, wherein the second switched DC electric machine having conduction ring and brush (1002) can be assembled by the mentioned components, wherein the second drive control device (203) can be co-structured with the second switched DC electric machine having conduction ring and brush (1002) or separately provided.

7. A cross-interlocked switch type DC electric machine having auxiliary excitation winding and conduction ring and brush as claimed in claim 6, wherein further includes that adjacent serial type auxiliary excitation winding sets of two or more switched DC electric machines having conduction ring and brush can be connected in series at the electric power input end of the drive control device served to drive the magnetic field winding set of electric machine, then leaded to the DC power source, and the serial type auxiliary excitation winding set of the last set of switched DC electric machine having conduction ring and brush is connected in series with the electric power input end of the first drive control device served to drive the first magnetic field winding set of electric machine then leaded to the DC power source, thereby constituting the cross-interlocked switch type DC electric machine having auxiliary excitation winding and conduction ring and brush.

8. A cross-interlocked switch type DC electric machine having auxiliary excitation winding and conduction ring and brush as claimed in claim 1, wherein further includes that adjacent serial type auxiliary excitation winding sets of two or more switched DC electric machines having conduction ring and brush can be connected in series at the electric power input end of the drive control device served to drive the magnetic field winding set of electric machine, then leaded to the DC power source, and the serial type auxiliary excitation winding set of the last set of switched DC electric machine having conduction ring and brush is connected in series with the electric power input end of the first drive control device served to drive the first magnetic field winding set of electric machine then leaded to the DC power source, thereby constituting the cross-interlocked switch type DC electric machine having auxiliary excitation winding and conduction ring and brush.

* * * * *